Nov. 3, 1953  A. R. LONG ET AL  2,657,787
FLIGHT CONVEYER
Filed Feb. 2, 1948  2 Sheets-Sheet 1

INVENTORS
Armistead R. Long
John B. Long
BY Lancaster, Allwine & Rommel
ATTORNEYS.

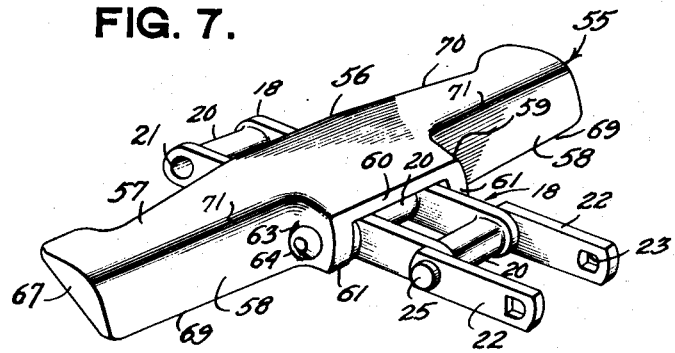
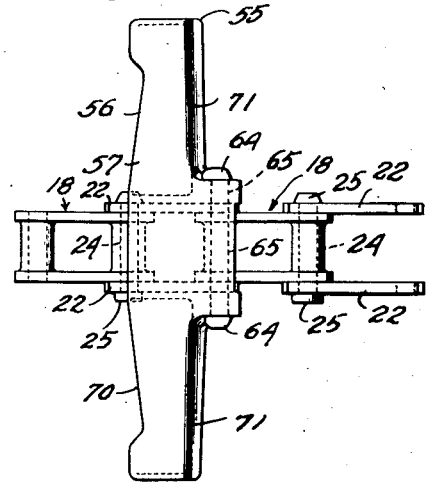
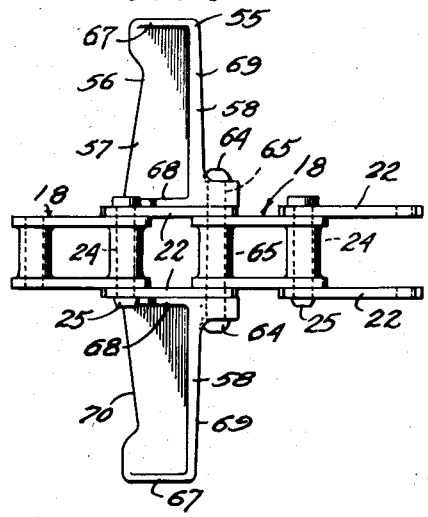
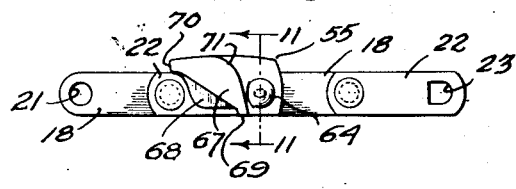
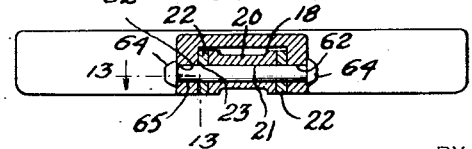
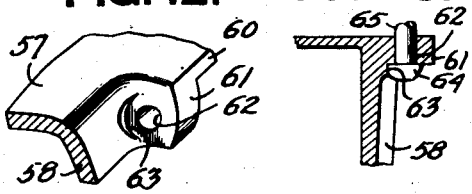

Patented Nov. 3, 1953

2,657,787

UNITED STATES PATENT OFFICE 2,657,787

FLIGHT CONVEYER

Armistead R. Long, Fayetteville, and John B. Long, Fayette, W. Va.; Pauline McCauley Long and Chas. E. Mahan, executors of said Armistead R. Long, deceased Application February 2, 1948, Serial No. 5,698

8 Claims. (Cl. 198—176)

This invention relates to flight conveyors of the type comprising an endless chain and flights carried thereby and extending laterally of the chain, used in moving lump material, such as coal.

It is common practice to secure the flights to links of the chain, by rivets, or form them integral with block links of the chain.

In conveyors of this type, where heavy loads are to be moved and there is likelihood of overloading the conveyor, it is common practice to interpose a shear pin arrangement in the motion transmitting means between the prime mover and the chain, which will yield or give way when the load upon the chain is approaching a strain likely to damage the chain. By way of example a chain may be used having an ultimate strength of around twenty thousand pounds, and should be worked under normal load from twenty-five hundred to three thousand pounds and ordinarily should not be subjected to a load over six thousand pounds. To protect a chain under such condition, a shear pin arrangement is provided which will yield or give way somewhere around six thousand pounds.

In practice, however, it has been found that when a flight fouls on the end, such as by engaging some rigid object, as the end of a conveyor pan which is in misalignment with an adjacent pan, the side strain is multiplied many times the forward strain, resulting in the flight being pulled off the chain, as by shearing its riveted connection with the chain link, if rivets are used for that purpose, or either bending the flight or breaking a side bar of the chain, if of the integral construction above referred to. The excessive side strain damages the flight or the chain before the forward strain is sufficient to bring the shear pin arrangement into operation.

The principal object of the present invention is to provide flight conveyors which avoid this damage to the flight and/or chain, when a flight engages an obstruction, such as of the character above referred to by way of example, by causing the shear pin arrangement to operate, rather than damage the flight or chain, thus causing that arrangement to act not only as a safety device for the chain, in the event of an overload of material encountered by the flights and causing a forward strain, but also as a safety device for the flight itself.

In one embodiment of the invention, the improvement is aptly termed a combined flight and chain section, in which the flight is fabricated from sheet or strip material, or stock of angular cross section and welded to chain side bars and to a relatively long cross pin, extending thru the side bars and the spool of a block link. Such an embodiment of the invention has been found satisfactory where the normal load likely to be delivered to the conveyor is not as heavy as given in the foregoing example. It has the advantage that stock side bars and block links may be used in making the assembly and is comparatively light in weight. The relatively long cross pin serves to reinforce the flight body against bending backward with respect to the direction of travel of the chain, and takes the side strain, to quite some extent, off the side bars and transmits it to the cross pin and the spool of the block link. It places the strain so close to the center of the spool as to reduce leverage on the side bars.

In another embodiment of the invention, the flight is preferably made of cast metal and is applicable to conventional chains comprising side bars and block links, but using longer cross pins for connection of each flight to the adjacent side bars and block link. No welding is required with this type of flight, however the engagement of the flight body with the side bars and the relatively long cross pin engaging the flight body and extending thru openings in the ends of the side bars and thru the spool of the block link assist in transmitting the abnormal strain coming upon the flight, when fouled, to the chain in a manner to cause operation of the shear pin arrangement associated with the conveyor, before either the flight or chain is damaged.

Another object is to provide flights which are generally of angular cross section and so shaped as to give maximum rubbing surface on the back of the flight when in the lower or return run of the chain, as when sliding on rails beneath the conveyor pans. This avoids, among other faults of some types of flights in common use, rapid wear of metal from the flight and makes possible long use of the flight without likelihood of its traveling so low between the supporting rails beneath the pan sections of the conveyor as to be likely to become fouled on other elements of the conveyor, such as cross supports beneath the rails.

Another object is to provide flights which are not likely to foul even tho traveling in a direction counter to normal travel, such as when the conveyor is used to deliver tools and supplies to workmen at the normal load receiving end of the conveyor.

Another object is to provide a combination flight and chain section, the latter comprising a plurality of side bars and block links, arranged to facilitate assembly of conveyor chains by unskilled workmen using a plurality of such combinations and so as to assure even spacing of the flights thruout the conveyor chain.

Further objects will appear in the following detailed description of two highly satisfactory embodiments of our invention, taken in connection with the accompanying drawings, forming a part of this specification, and in which drawings:

Fig. 7 is a view similar to Fig. 1, but showing a modified form of conveyor flight with combination.

Figs. 8, 9 and 10 are respectively, top, and bottom plan views and side elevation of the section shown in Fig. 7.

Fig. 11 is a sectional view on the line 11—11 of Fig. 10.

Fig. 12 is a fragmentary detail view in perspective of a portion of the flight shown in Fig. 7.

Fig. 13 is a fragmentary sectional view on substantially the line 13—13 of Fig. 11.

Figure 1:
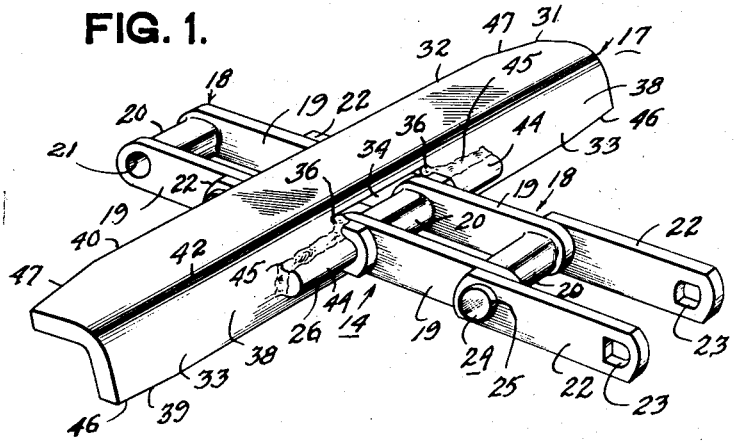
Fig. 1 is a perspective view of a combination flight and chain section showing one embodiment of our invention.
Figure 2:
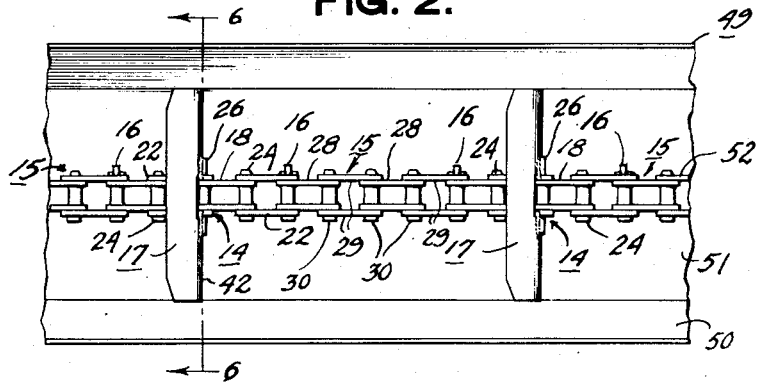
Fig. 2 is a plan view showing the invention incorporated in a flight conveyor.

Referring first to the form of invention disclosed in Figs. 1 to 6, inclusive, a combination flight and chain section 14 is shown in Figs. 1, 3, 4 and 5, in a form it is preferred manufactured as a conveyor unit or permanent combination, for detachable connection with chain sections 15 devoid of any flights shown in Fig. 2, the sections 14 and 15 being connected together by detachable chain pins 16.

Each combination flight and chain section 14 comprises a flight 17; a plurality of block links 18 each having spaced parallel side portions 19 integrally connected at ends to transverse spools 20; having bores 21 transversally of the chain; a plurality of side bars 22, each having an aperture 23 at each end, the side bars 22 being arranged in pairs for connection with adjacent block links; a plurality of relatively short chain pins 24 extending thru selected apertures 23 and aligned bores 21 of the block links, the pins 24 each having an enlarged head 25 at each end; and a relatively long chain pin 26 extending thru selected apertures 23 of selected side bars 22 and the aligned bore 21 of the adjacent block link spool, the ends of the chain pin 26 being permanently associated with the flight 17 as hereinafter described.

By way of example, each combination flight and chain section 14, as a permanent combination may comprise one flight 17, two block links 18, two pair of side bars 22, two relatively short chain pins 24, and one relatively long chain pin 26. The chain section 15 may comprise two block links 28, two pairs of side bars 29 and three relatively short chain pins 30, each permanently headed at each end. Thus, furnishing unskilled labor with a supply of sections 14 and 15, with instructions to alternately connect, first a section 14 with a section 15, and then a section 14, and so on, is most likely to result in a chain assembly with the flights evenly spaced apart longitudinally of the conveyor, in contradistinction to providing separate block links with flights integral therewith or riveted thereto, and various other chain members devoid of flights, leaving it to skilled labor to measure off the spacing of block links with flights for the production of the desired chain length having equally spaced flights.

The flight 17 shown more in detail in Figs. 1, 3, 4 and 5 is an elongated body 31 which may be fabricated from sheet or strip metal or from stock metal of angular cross-section. It is an elongated body of generally angular cross-section, comprising a first flange 32, substantially coextensive with the body 31, and a pair of second flanges 33 in angular relation to flange 32, these flanges 33 being in the same plane and in spaced relation midway of the body to provide an opening 34 in which companion side bars 22 of a selected pair are disposed.

Figure 3:
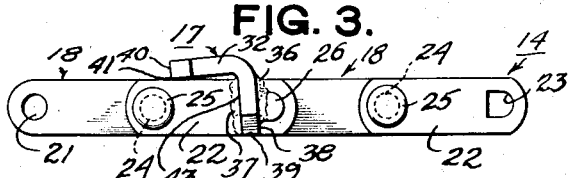
Figs. 3 and 4 are views in side elevation of the section shown in Fig. 1, looking toward opposite sides thereof.
Figure 4:
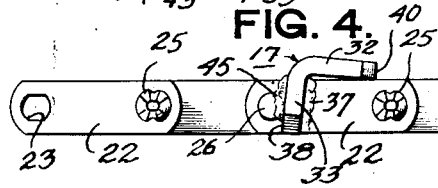
Figure 5:
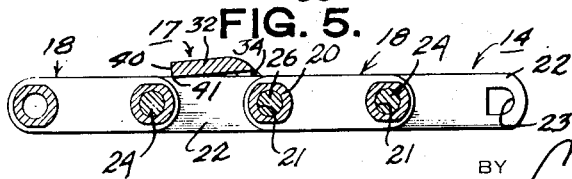
Fig. 5 is a longitudinal central vertical sectional view thru the section shown in Fig. 1.

The flight is welded in straddling relation to the selected side bars, as by welds 36 and 37, and is disposed transversally with respect to the side bars in a manner that the plane of the front or load pushing faces 38 of the flanges 33 is tangential to the inner sides of apertures 23 at selected ends of the side bars, as indicated by dotted lines in Figs. 3 and 4. The flight is also preferably arranged so that the flanges 33 are disposed in a plane in obtuse angular relation to the line of pull of the chain, inclining from their free edges 39 upwardly and rearwardly toward the plane of flange 32, and the flange 32 in a plane in acute angular relation to the line of pull of the chain, inclining upwardly and forwardly from its free edge 40 toward the plane of flanges 33. The edge 40 of the flange 32 may rest upon the side bars 22 as shown in Figs. 3, 4 and 5 as at 41, and the juncture between the flanges 32 and 33 may be rounded as indicated at 42.

The weld 36 is preferably located between each side bar 22 and its adjacent flange 33 at the face 38 thereof and the weld 37 may extend the full height of side bar between the outer face thereof and the rear face 43 of the flange 33, as shown in Figs. 3 and 4. It is understood that the inner ends of flanges 33 at the opening 34, preferably bear upon the outer faces of the side bars 22, so that strong welds 36 and 37 may be had, in effect making the flight integral with the side bars.

The relatively long chain pin 26 has its intermediate portion neatly fitting in the bore 21 of the adjacent block link spool and the aligned openings in the side bars, and has substantial end extensions 44 bearing upon the pushing faces 38 of the flanges 33. These end extensions 44 are secured to the flanges 33 by welds 45 preferably extending along the rear upper end and under portions of each extension 44.

It is preferred to clip or round the outer corners of the flanges 33 and flange 32, as shown at 46 and 47 respectively to reduce the liability of fouling, when the conveyor chain is moving in either direction.

Figure 6:
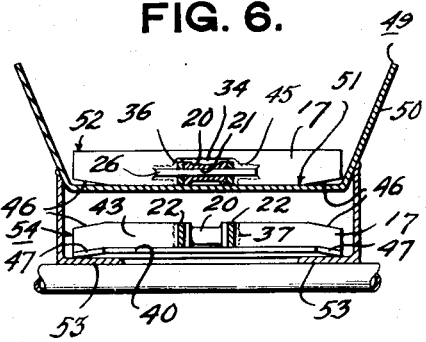
Fig. 6 is a sectional view on the line 6—6 of Fig. 2.

In Figs. 2 and 6, portions of a conventional conveyor pan or intermediate section 49 is shown with the flight conveyor in place. The pan comprises a trough 50 upon the bottom 51 of which the upper run 52 of the endless flight conveyor chain rides. Below the trough are rails 53 upon which the lower run 54 is supported by the end portions of the flights 17 rubbing upon the rails. Normally the upper run of the conveyor chain, as viewed in Fig. 2, travels from left to right, pushing the material in that direction. If either end of any flight engages an obstruction such as misaligned pan sections the strain is mainly transmitted to the relatively long chain pin 26 to the sturdy hub portion of the block link, thus causing any shear pin arrangement not shown in the drawings, but hereinbefore mentioned, to operate, before the flight or chain, and particularly the side bars 32 are broken or damaged.

It will be noted from Fig. 6, that the flights when forming a part of the lower run 54 ride, at their end portions on the rounded surfaces 42 and the inclined relationship of the flanges 32 and 33 to the surfaces of the rails 53 cause the flights to ride with comparative ease over the average bumps at the ends of rails which may be due to misalignment or bent corners or ends. The conveyor flight chain may at times be caused to travel in a direction counter to that above described, such as when conveying materials to workmen at the receiving end of the conveyor. Such materials may be timbers, bits, drills, cap boards, etc. some of which are comparatively heavy and it will be noted that the relatively long chain pin 26 in a manner backs-up or reinforces the flight with which it is associated to effectively move heavy loads in the pan sections even when the flight conveyor is moving in an abnormal direction.

In Figs. 7 to 13, inclusive is shown a form of combination flight and chain section, similar to that previously described, the difference residing in the flight 55 which may be of cast metal. It is an elongated body 56 of generally angular cross section, comprising a first flange 57 coextensive with the body 56; a pair of second flanges 58 in angular relation to the flange 57 and spaced apart so that the flight straddles the conveyor chain; and an inverted U-shaped projection 59 having its bight portion 60 integral with the flange 57 and its depending arms 61 integral with the flanges 58. This projection, also straddles the conveyor chain and each arm 61 has a transverse aperture 62 for axial alignment with the apertures 23 in the normally forward ends of the side bars 22 and the bore 21 of the normally rearward spool 20 of the block link 18. At the juncture of the rear portions of the arms 61 with their respective flanges 58 the casting may be cored out to provide a recess 63 preferably at a radius from the axis of apertures for the reception of enlarged end projections 64 of a relatively long chain pin 65 which fits neatly in the apertures 62 and bore 21 of the block link 18. One of the end projections 64 may be provided on the pin 65 before it is inserted in place and made of a size to intimately engage, as by driven fit, into the recess 63, the other projection being formed after assembly by upsetting the other end of the pin until the projection also intimately engages in its respective recess 63.

It is preferred to provide the flight 55 with triangular end webs 67 to strengthen the flight at ends, and to also provide transverse fins or webs 68 beneath and integral with the flange 57, rearwardly of and integral with the flanges 58, and disposed for outside engagement with the side bars 22 as shown in Figs. 9 and 10. These fins or webs strengthen the flight and transmit any side pressure upon the side bars, resulting from fouling of the flight, to a relatively large area of the side bar at the side nearest the obstruction.

The flight 55 is preferably shaped so that the flanges 58 are disposed in planes in obtuse angular relation to the line of pull of the chain, inclining from their free edges 69 upwardly and rearwardly toward the plane of flange 57, and the flange 57 is disposed in a plane in acute angular relation to the line of pull of the chain, inclining upwardly and forwardly from its free edge 70 toward the planes of flanges 58. The rear edge of flange 57 may rest upon the rear portions of the side bars 22, and the juncture between the flanges 57 and 58 may be rounded as indicated at 71, as in the form shown in Figs. 1–6.

We also prefer to dispose the flanges 58 in planes that diverge very slightly from a zone at the chain, rearwardly and outwardly, this tending, among other things, to distribute the load of the lump material more evenly in the pan sections and away from the zone of the chain.

In reduction to practice, it has been found that the forms of the invention illustrated in the drawings and referred to in the above description, are efficient and practical; yet realizing that conditions concurrent with particular installations will necessarily vary it is desired to emphasize the fact that minor changes in details of formation, proportion and arrangement of parts may be resorted to, when required, without sacrificing any of the advantages of the invention, as defined in the appended claims.

We claim:

1. A conveyor flight for use with endless conveyor chains, comprising an elongated body of generally angular cross-section providing a first flange substantially coextensive with the body, and a pair of second flanges in angular relation to said first flange, said second flanges being in substantially the same plane and in spaced relation midway of the body whereby the flight may be disposed in crosswise straddling relation to the length of the conveyor chain, and a chain pin having its intermediate portion traversing the space between said second flanges and end portions bearing against the front outer faces of said second flanges.

2. A conveyor flight for use with endless conveyor chains, comprising an elongated body of generally angular cross-section providing a first flange substantially coextensive with the body, and a pair of second flanges in angular relation to said first flange, said second flanges being in substantially the same plane and in spaced relation midway of the body whereby the flight may be disposed in crosswise straddling relation to the length of the conveyor chain, and a chain pin having its intermediate portion traversing the space between said second flanges and end portions welded to the front outer faces of said second flanges.

3. A conveyor flight for use with endless conveyor chains, comprising an elongated body of generally angular cross-section providing a first flange substantially coextensive with the body, and a pair of second flanges in angular relation to said first flange, said second flanges being in substantially the same plane and in spaced relation midway of the body whereby the flight may be disposed in crosswise straddling relation to the length of the conveyor chain, and an inverted U-shaped projection at the forward portion of said body including a bight portion integral with said first flange and depending arms integral with said second flanges at their inner end portions, said arms provided with aligned apertures for receiving a chain pin.

4. A conveyor flight for use with endless conveyor chains, comprising an elongated body of generally angular cross-section providing a first flange substantially coextensive with the body, and a pair of second flanges in angular relation to said first flange, said second flanges being in substantially the same plane and in spaced relation midway of the body whereby the flight may be disposed in crosswise straddling relation to the length of the conveyor chain, and an inverted U-shaped projection at the forward portion of said body including a bight portion integral with said first flange and depending arms integral with said second flanges at their inner end portions, said arms provided with aligned apertures for receiving a chain pin, and the flight provided with recesses at the junctures between said arms and second flanges and adjacent said apertures for the reception of heads of the chain pin.

5. A conveyor flight for use with endless conveyor chains, comprising an elongated body of generally angular cross-section providing a first flange substantially coextensive with the body, and a pair of second flanges in angular relation to said first flange, said second flanges being in substantially the same plane and in spaced relation midway of the body whereby the flight may be disposed in crosswise straddling relation to the length of the conveyor chain, and fins integral with the under sides of said first flange and the rear sides of said second flanges for engagement with the outer faces of a conveyor chain link.

6. A conveyor flight of the character described for use with an endless conveyor chain having upper and lower runs, comprising an elongated body of generally angular cross-section providing a first flange substantially coextensive with the body and adapted to be disposed uppermost when in the upper run of the chain, and lowermost when in the lower run of the chain, and in a plane in acute angular relation to the line of pull of the chain when in operation, and with its longitudinal edge most remote from said line, constituting the leading edge when the chain is moving in a predetermined direction, and a pair of second flanges extending longitudinally of the body and from said leading edge of the first flange to act as pusher blades when the chain is moving in said predetermined direction, said second flanges in substantially the same plane in obtuse angular relation to the line of pull of the chain when operating and said second flanges in spaced relation midway of the body whereby the flight may be disposed in crosswise straddling relation to the length of the chain; and means carried by said body extending from the front or load pushing faces of said second flanges adjacent to the space therebetween constructed and arranged for connection of the flight to the conveyor chain.

7. As an article of manufacture, a conveyor section comprising the permanent combination of a flight unit, a plurality of block link units, a plurality of side bar units, a plurality of relatively short chain pins, and a relatively long chain pin, constructed and arranged with the flight unit in a zone intermediate two of the block link units, with the relatively short chain pins pivotally connecting the side bar units to the block link units, with the relatively long pin connecting the flight unit to one of the block link units, and with the ends of the relatively short chain pins enlarged at the outer sides of the side bar units and the ends of the relatively long chain pin permanently associated with the flight unit against axial movement transversally of the chain so as to form a permanent combination.

8. As an article of manufacture, a conveyor flight and chain unit comprising a flight including an elongated body of generally angular cross-section, providing a first upper flange substantially coextensive with the body and a pair of second forwardly facing material pushing flanges in angular relation to said first flange, said second flanges being in substantially the same plane and in spaced relation midway of the body, and a pair of elongated webs disposed crosswise of the flight body and integral with the underside of said first flange and the adjacent ends of said second flanges, said webs in spaced apart relation and each provided with transverse chain pin receiving openings adjacent its ends; a block link fitted between the ends of said webs adjacent said second flanges and including a spool the hole of which is coaxial with the adjacent openings of said webs; and a chain pin extending through said hole of the spool and said last mentioned openings pivotally connecting the block link to the flight, the ends of the chain pin being enlarged so as to form a permanent combination.

ARMISTEAD R. LONG.
JOHN B. LONG.

References Cited in the file of this patent

UNITED STATES PATENTS

| Number | Name | Date |
|---|---|---|
| 505,296 | Pollock | Sept. 19, 1893 |
| 765,990 | Phillips | July 26, 1904 |
| 1,748,033 | Bennett | Feb. 18, 1930 |
| 1,850,686 | Pangborn | Mar. 22, 1932 |
| 2,094,789 | Gellatly | Oct. 5, 1937 |
| 2,349,208 | Sudduth | May 16, 1944 |

FOREIGN PATENTS

| Number | Country | Date |
|---|---|---|
| 559,878 | Germany | Sept. 24, 1932 |